United States Patent
Ressler et al.

(10) Patent No.: US 12,308,404 B2
(45) Date of Patent: May 20, 2025

(54) MITIGATION OF THERMAL RUNAWAY IN A BATTERY MODULE

(71) Applicant: GM GLOBAL TECHNOLOGY OPERATIONS LLC, Detroit, MI (US)

(72) Inventors: Galen E. Ressler, White Lake, MI (US); Bin Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 860 days.

(21) Appl. No.: 17/525,160

(22) Filed: Nov. 12, 2021

(65) Prior Publication Data
US 2023/0155206 A1    May 18, 2023

(51) Int. Cl.
*H01M 10/63* (2014.01)
*H01M 10/48* (2006.01)
*H01M 10/613* (2014.01)
*H01M 10/625* (2014.01)
*H01M 50/249* (2021.01)

(52) U.S. Cl.
CPC ......... *H01M 10/63* (2015.04); *H01M 10/486* (2013.01); *H01M 10/613* (2015.04); *H01M 10/625* (2015.04); *H01M 50/249* (2021.01); *H01M 2220/20* (2013.01)

(58) Field of Classification Search
CPC .. H01M 10/63; H01M 10/613; H01M 10/625; H01M 50/249; H01M 10/486; H01M 2220/20
See application file for complete search history.

(56) References Cited

U.S. PATENT DOCUMENTS

| | | | | |
|---|---|---|---|---|
| 8,920,955 B1* | 12/2014 | Chuang | ............... | H01M 10/653 429/7 |
| 2011/0298626 A1* | 12/2011 | Fechalos | ............. | H02J 7/00309 320/152 |
| 2013/0130074 A1* | 5/2013 | Timmons | ................ | B60L 58/26 29/890.032 |
| 2015/0037646 A1* | 2/2015 | Wyatt | ................. | H01M 10/058 29/623.2 |
| 2015/0037647 A1* | 2/2015 | Nguyen | ............ | H01M 10/6555 429/120 |
| 2015/0037648 A1* | 2/2015 | Nguyen | .............. | H01M 10/613 429/120 |

FOREIGN PATENT DOCUMENTS

CN    103123996    *    8/2016

* cited by examiner

*Primary Examiner* — Alexander Usyatinsky
(74) *Attorney, Agent, or Firm* — Quinn IP Law

(57) ABSTRACT

A battery module includes a first battery cell and a neighboring second battery cell. The battery module also includes a heat sink in contact with and configured to absorb thermal energy from each of the first battery cell and the second battery cell. The battery module additionally includes a module enclosure surrounded by ambient environment and configured to house each of the first battery cell, the second battery cell, and the heat sink. The battery module further includes a heat transfer mechanism having a first switch configured to detect temperature of the first battery cell exceeding a predetermined value indicative of a thermal runaway event. The heat transfer mechanism is also configured to transfer thermal energy from the first battery cell to the module enclosure to thereby control propagation of the thermal runaway event to the second battery cell.

18 Claims, 8 Drawing Sheets

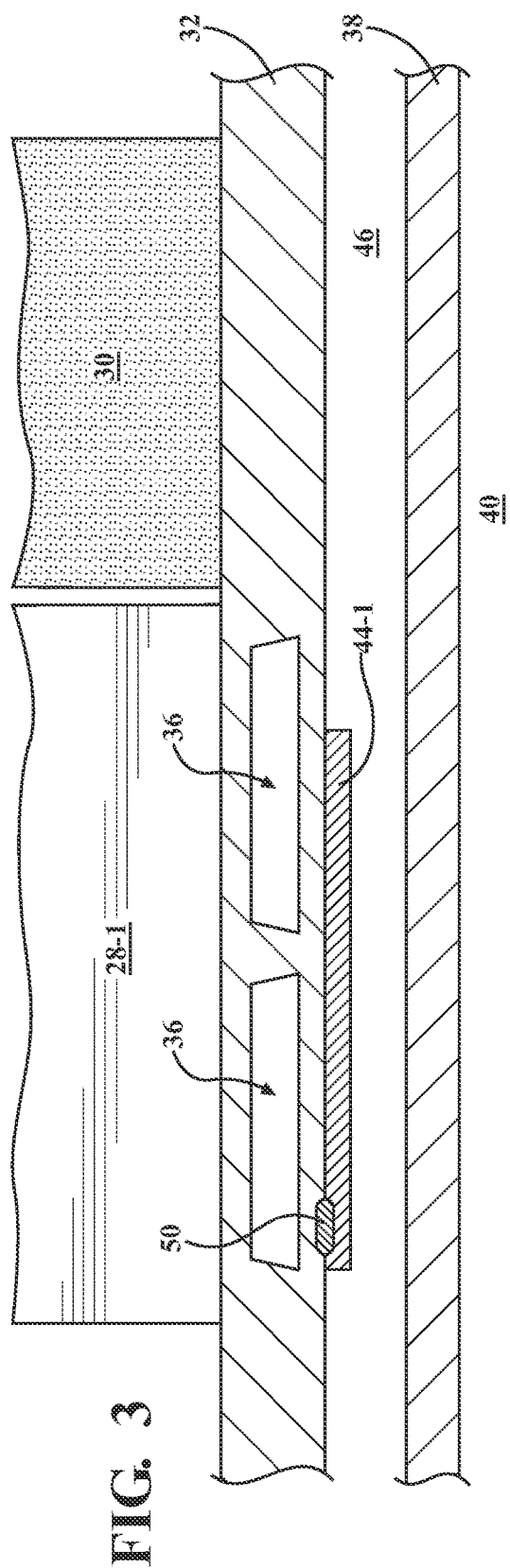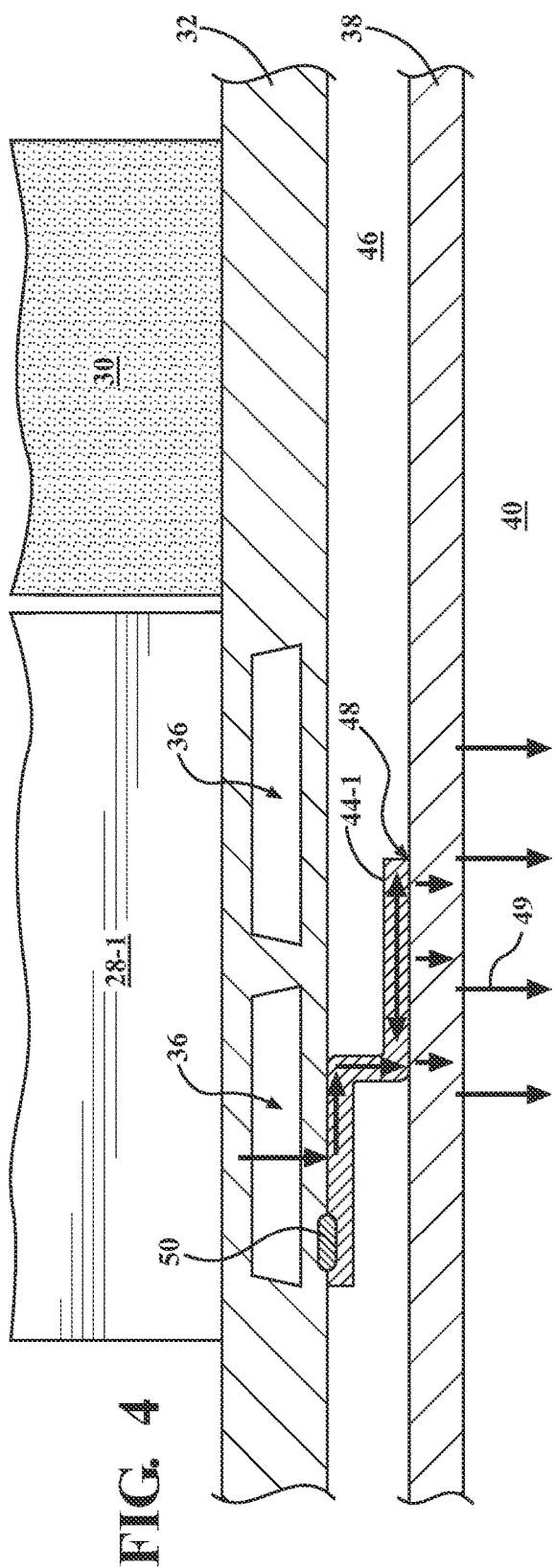

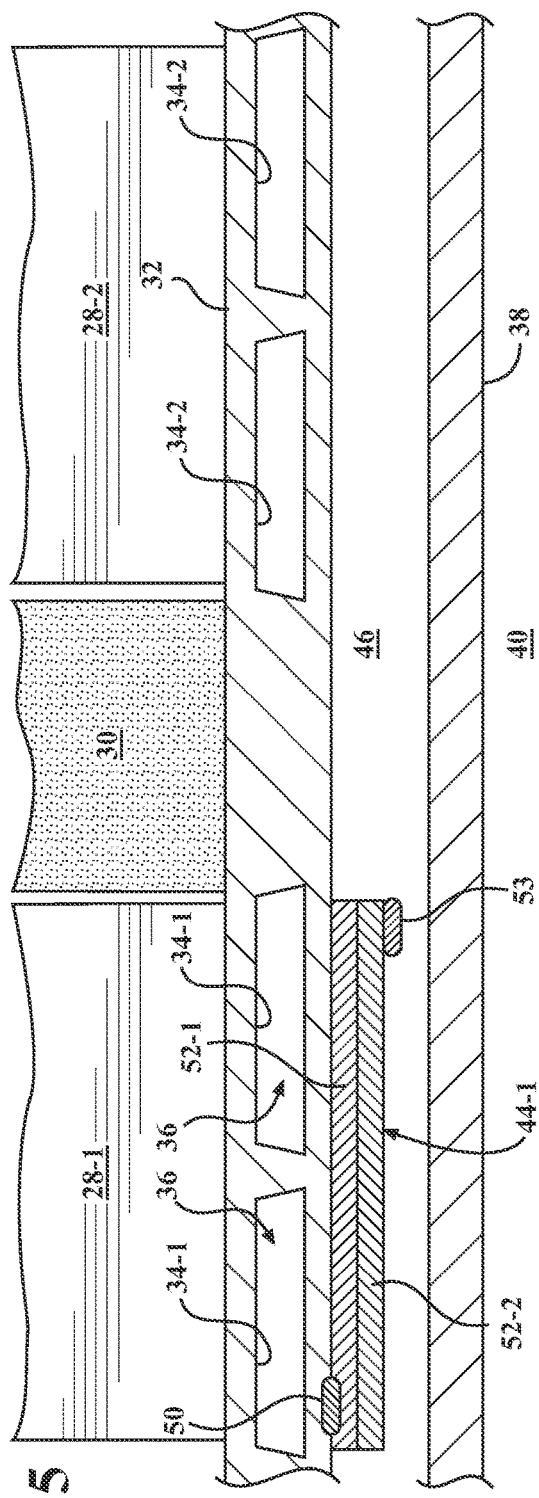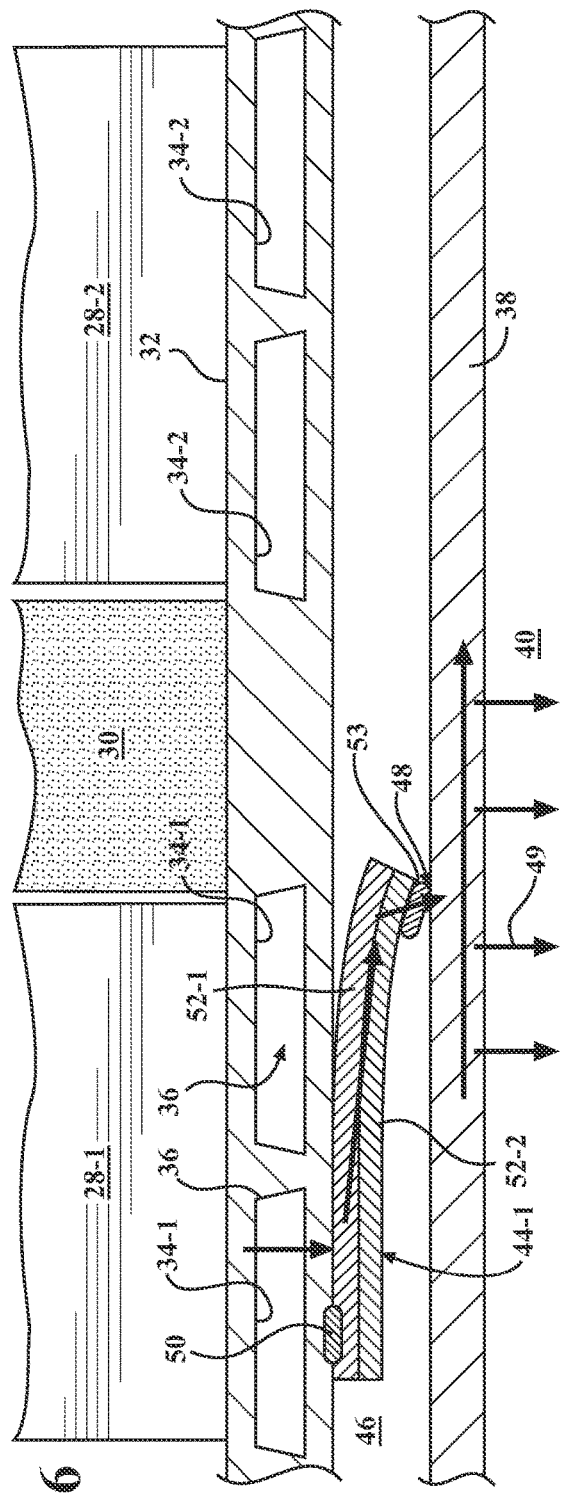

MITIGATION OF THERMAL RUNAWAY IN A BATTERY MODULE

INTRODUCTION

The present disclosure relates to heat removal and thermal runaway event mitigation in a battery module.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a first battery cell and a neighboring second battery cell. The battery module also includes heat sink in contact with and configured to absorb thermal energy from each of the first battery cell and the second battery cell. The battery module additionally includes a battery module enclosure surrounded by ambient environment and configured to house each of the first battery cell, the second battery cell, and the heat sink. The battery module further includes a heat transfer mechanism having a first switch configured to detect temperature of the first battery cell exceeding a predetermined value indicative of a thermal runaway event. The heat transfer mechanism is also configured to transfer thermal energy from the first battery cell to the battery module enclosure to thereby control propagation of the thermal runaway event to the second battery cell.

An air gap may be arranged between the battery module enclosure and the heat sink and be configured to insulate the battery module enclosure from the heat sink. The first switch may be configured to bridge the air gap and establish a direct contact between the battery module enclosure and the heat sink to conduct thermal energy from the first battery cell to the battery module enclosure.

The first switch may be configured as a shape-memory alloy element mounted to the heat sink and configured to change shape and thereby bridge the air gap when the temperature of the first battery cell exceeds the predetermined value.

The first switch may be a bimetal strip configured to change shape when the temperature of the first battery cell exceeds the predetermined value.

The bimetal strip may be either welded or brazed to the heat sink.

The first switch may include at least one rotatable blade configured to bridge the air gap and a shape-memory alloy actuator configured to rotate the at least one rotatable blade when the temperature of the first battery cell exceeds the predetermined value.

The shape-memory alloy actuator may be a coiled member configured to change shape when the temperature of the first battery cell exceeds the predetermined value.

The at least one rotatable blade may include multiple rotatable blades linked via a connecting rod operated by the shape-memory alloy actuator.

The heat sink may be a coolant plate having a first coolant channel arranged proximate the first battery cell. In such an embodiment, the first switch may be mounted adjacent the first coolant channel.

The battery system may additionally include an insulating member arranged between the first battery cell and the second battery cell.

A motor vehicle having a power-source and the above-disclosed battery module configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic close-up cross-sectional partial plan view of the battery system shown in FIG. 2 and one embodiment of a heat transfer mechanism, wherein the heat transfer mechanism is depicted in an open state, according to the disclosure.

FIG. 4 is a schematic close-up cross-sectional partial plan view of the battery system shown in FIG. 3, with the switch of the heat transfer mechanism depicted in a closed state.

FIG. 5 is a schematic close-up cross-sectional partial plan view of the battery system shown in FIG. 2, and another embodiment of the heat transfer mechanism having a switch configured to mitigate thermal runaway in one of the battery cells, wherein the heat transfer mechanism is depicted in an open state, according to the disclosure.

FIG. 6 is a schematic close-up cross-sectional partial plan view of the battery system shown in FIG. 5, with the switch of the heat transfer mechanism depicted in a closed state.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
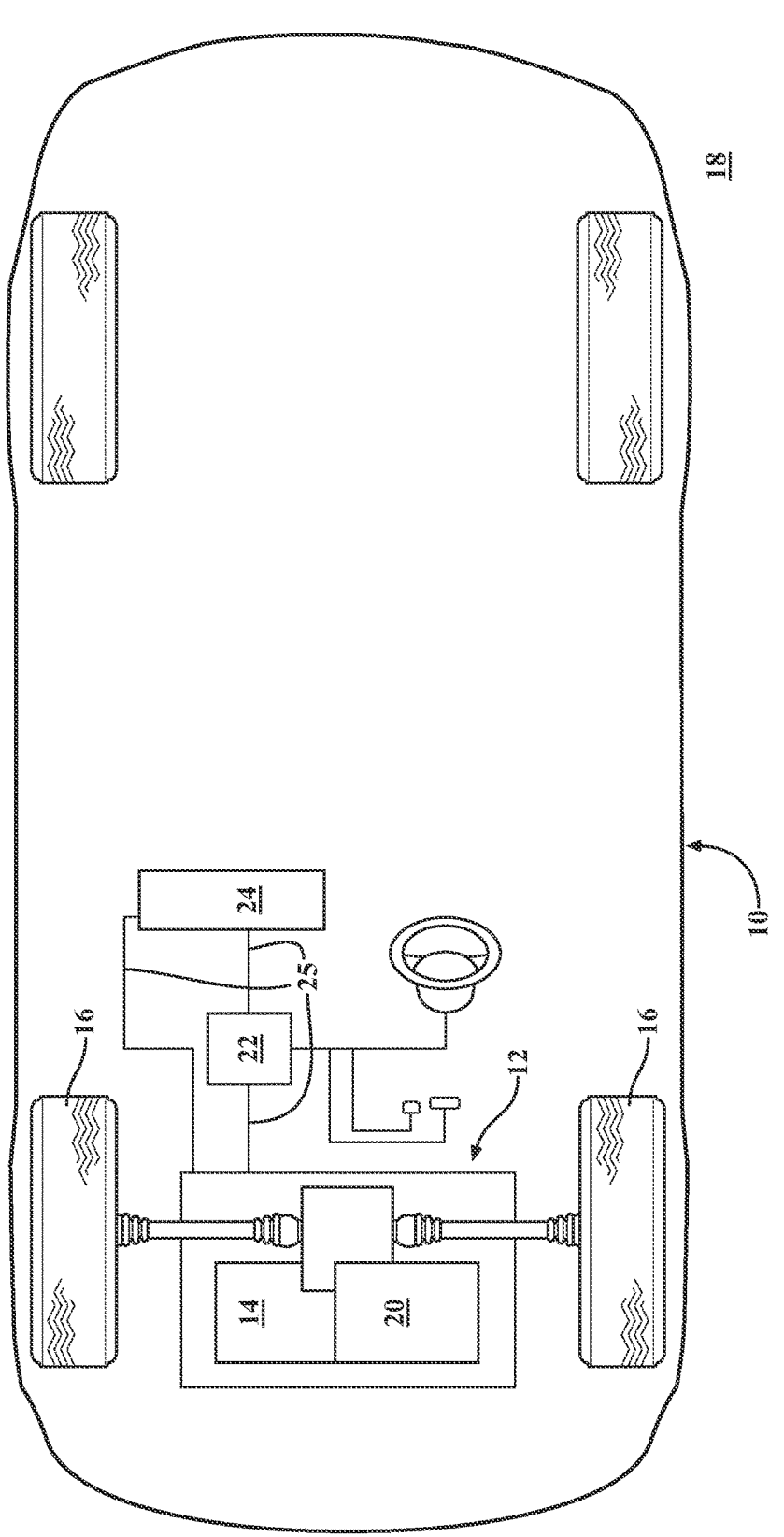
FIG. 1 is a schematic top view of an embodiment of a motor vehicle employing multiple power-sources and a battery system having battery cells configured to generate and store electrical energy, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 to generate a predetermined amount of power-source torque T.

Figure 2:
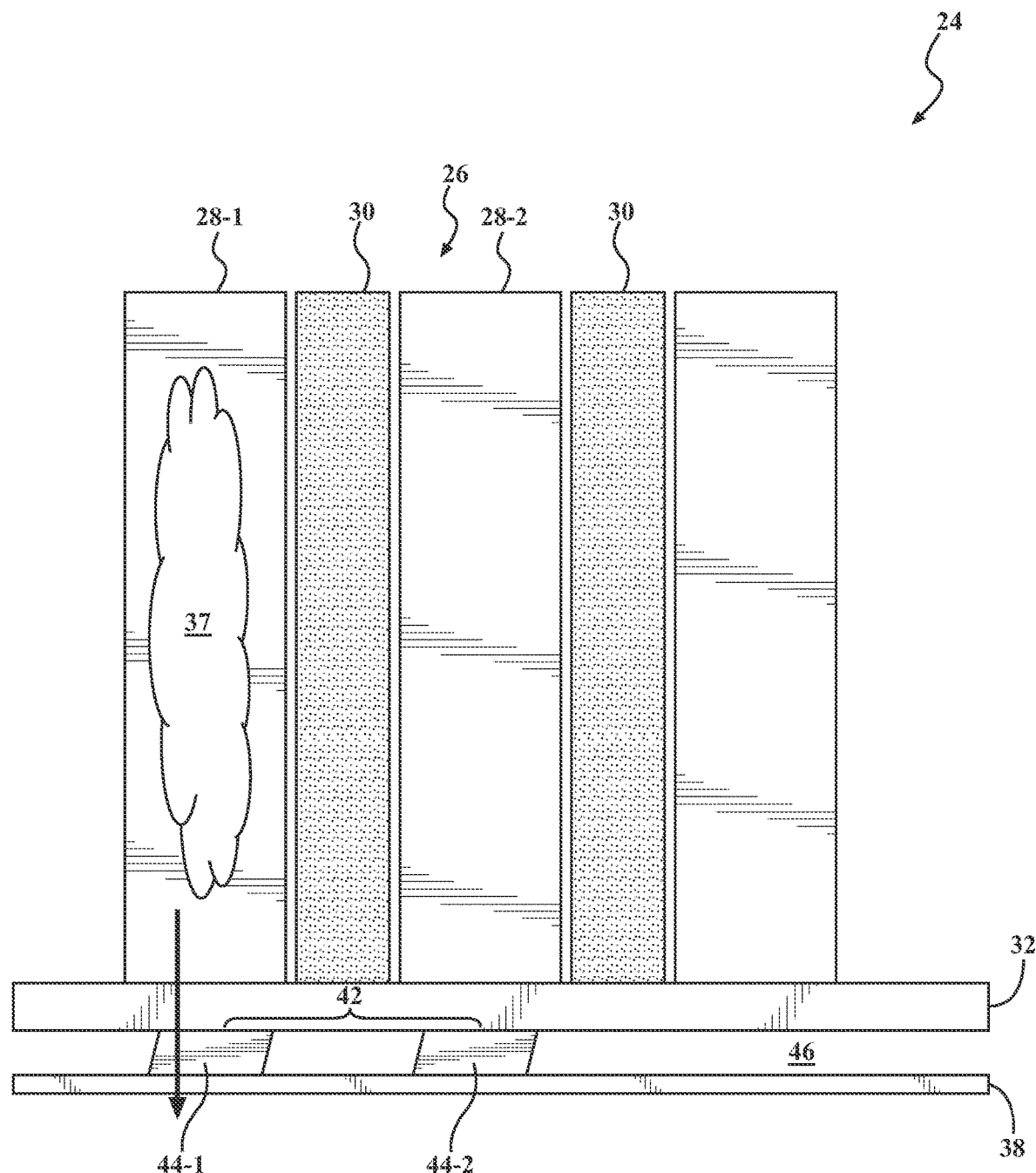
FIG. 2 is a schematic close-up cross-sectional plan view of the battery system shown in FIG. 1, having a heat sink, a battery module enclosure, and a general representation of a heat transfer mechanism having a switch configured to mitigate thermal runaway in one of the battery cells, according to the disclosure.

The battery system 24 may be connected to the power-sources 14 and 20, the electronic controller 22, as well as other vehicle systems via a high-voltage BUS 25. As shown in FIGS. 2-5, the battery system 24 may include one or more sections, such as a battery array or module 26. As shown in FIG. 2, the battery module 26 includes a plurality of battery cells, such as a first battery cell 28-1 and a neighboring, directly adjacent, second battery cell 28-2. Although one module 26 and two battery cells 28-1, 28-2 are shown, nothing precludes the battery system 24 from having a greater number of such modules and battery cells. The battery module 26 also includes an insulating member or pad 30 arranged between the first battery cell 28-1 and the second battery cell 28-2. The insulating member 30 may be constructed from a high-temperature polymer foam configured to limit the amount of thermal energy transfer between the neighboring battery cells 28-1, 28-2. The insulating member 30 is also configured to maintain consistent and uniform contact with the first cell 28-1 and the second cell 28-2 during alternate expansion of the subject cells when charging and contraction of the cells when discharging.

As shown in FIGS. 2-10, the battery module 26 also includes a heat sink 32. The heat sink 32 is in direct contact with each of the first battery cell 28-1 and the second battery cell 28-2 and thereby configured to absorb thermal energy from the first and second battery cells. As shown, the heat sink 32 may be in direct physical contact with the first and second battery cells 28-1, 28-2. The heat sink 32 may be configured as a coolant plate having a plurality of coolant channels, shown as respective first and second coolant channels 34-1 and 34-2 in FIGS. 3-8. The coolant channels 34-1, 34-2 are specifically configured to circulate a coolant 36 and thereby remove thermal energy from the first and second battery cells 28-1, 28-2 while the battery module 26 generates/stores electrical energy. As shown in FIG. 2, the first coolant channel 34-1 may be arranged proximate (generally, either above or below) the first battery cell 28-1 and the second coolant channel 34-2 may be arranged proximate the second battery cell 28-2.

Generally, during normal operation of the module 26, the insulating member 30 is effective in absorbing thermal energy released by the first and second cells 28-1, 28-2 and facilitating transfer of the thermal energy to the heat sink 32. However, during extreme conditions, such as during a thermal runaway event (identified via numeral 37 in FIG. 2), the amount of thermal energy released by the cell undergoing the event will typically saturate the insulating member 30 and exceed its capacity to absorb and efficiently transfer heat to the heat sink 32. As a result, excess thermal energy will typically be transferred between the neighboring cells 28-1, 28-2, leading to propagation of the thermal runaway through the module 26. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

The battery module 26 also includes a battery module enclosure 38 surrounded by ambient environment 40 and configured to house each of the first battery cell 28-1, the second battery cell 28-1, and the heat sink 32. With continued reference to FIG. 2, the battery module 26 also includes a heat transfer mechanism 42. The heat transfer mechanism 42 includes a first switch 44-1 configured to detect temperature of the first battery cell 28-1 and a second switch 44-2 configured to detect temperature of the second battery cell 28-2. Specifically, each of the first switch 44-1 and the second switch 44-2 is configured to detect when the temperature of the corresponding first and second battery cell 28-1, 28-2 exceeds a predetermined or critical temperature value tc. Such predetermined temperature value is intended to be indicative of the thermal runaway event occurring in the respective battery cells 28-1, 28-2.

Each of the first switch 44-1 and the second switch 44-2 is further configured to transfer thermal energy from the corresponding first battery cell 28-1 and second battery cell 28-2 to the battery module enclosure 38 to thereby control propagation of the thermal runaway event to the neighboring cell. The first switch 44-1 may be arranged and mounted adjacent the first coolant channel 34-1, while the second switch 44-2 may be arranged and mounted adjacent the second coolant channel 34-2. The first and second switches 44-1, 44-2 may be normally open and then close upon detection of the critical temperature value tc. For example, upon detection of a thermal runaway event in the first battery cell 28-1, the first switch 44-1 will close to transfer thermal energy from the first battery cell 28-1 directly to the battery module enclosure 38. The transfer of excess thermal energy from the first battery cell 28-1 directly into the battery module enclosure 38 instead of through the insulating member 30 will thereby limit propagation of the thermal runaway to the neighboring cell.

As may be seen in FIG. 2, the battery module 26 includes an air gap 46 arranged between the battery module enclosure 38 and the heat sink 32. During normal battery module 26 operation, the air gap 46 is generally configured to insulate the battery module enclosure 38 from the heat sink 32. Furthermore, during normal battery module 26 operation, each of the first switch 44-1 and the second switch 44-2 is configured to remain open, such that the air gap 46 is maintained unbridged in the vicinity of the first and second battery cells 28-1, 28-2. Under adverse conditions of the thermal runaway event 37, for example, in the first battery cell 28-1, the first switch 44-1 is configured to bridge the air gap 46 and establish a direct physical contact 48 (shown in FIG. 4) between the battery module enclosure 38 and the heat sink 32. Such contact 48 will conduct thermal energy 49 from under the first battery cell 28-1 to the battery module enclosure 38 and generate a direct heat transfer path from the first battery cell to the ambient environment 40.

Each of the first and second switches 44-1, 44-2 may be configured as a shape-memory alloy (SMA) element mounted to the heat sink 32. An exemplary first switch 44-1 configured as the SMA element is shown in FIGS. 3 and 4. The shape-memory alloy element switches 44-1, 44-2 may thus be configured to change shape and bridge the air gap 46 when the temperature of the respective first and second battery cells 28-1, 28-2 exceeds the predetermined value tc. The SMA element switch 44-1 or 44-2 may be either welded or brazed to the heat sink 32 at one end via a weld/braze 50 shown in FIGS. 3-4. Generally, the SMA switch 44-1 or 44-2 exhibits a shape memory effect. That is, the SMA element switches 44-1, 44-2 may undergo a solid state, crystallographic phase change via a shift between a martensite phase, i.e., "martensite", and an austenite phase, i.e., "austenite." The martensite phase is a relatively soft and easily deformable phase of the shape memory alloys, which generally exists at lower temperatures. The austenite phase, the stronger phase of shape memory alloys, occurs at higher temperatures.

The temperature at which a shape memory alloy remembers its high temperature form, referred to as the phase transformation temperature, can be adjusted by applying stress and other methods. Accordingly, a temperature difference between the austenite phase and the martensite phase may be the phase transformation delta T. Alternatively stated, the SMA element may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—i.e., Young's modulus is approximately 2.5 times lower—than the comparatively higher-temperature austenite phase.

The temperature at which the SMA element begins to change from the austenite phase to the martensite phase is known as the martensite start temperature, Ms. The temperature at which the SMA element completes the change from the austenite phase to the martensite phase is known as the martensite finish temperature, MF. Similarly, as the SMA element is heated, the temperature at which the SMA element begins to change from the martensite phase to the austenite phase is known as the austenite start temperature, $A_S$. The temperature at which the SMA element completes the change from the martensite phase to the austenite phase is known as the austenite finish temperature, $A_F$. Therefore, the SMA element may be characterized by a cold state, i.e., when a temperature of the SMA element is below the martensite finish temperature MF of the subject SMA element. Likewise, the SMA element may also be characterized by a hot state, i.e., when the temperature of the SMA element is above the austenite finish temperature $A_F$ of the SMA element.

Alternatively, each of the first and second switches 44-1, 44-2 may be a bimetal strip configured to change shape, such as bow or curl, when the temperature of the first battery cell 28-1 exceeds the predetermined value tc. The subject bimetal strip may be constructed from a joined together first strip 52-1 and second strip 52-2. An exemplary first switch 44-1 configured as the bimetal strip is shown in FIGS. 5 and 6. The bimetal strip 52 may be constructed as a strip of copper 52-1 and a strip of steel 52-2 joined together and either welded or brazed to the heat sink 32 at one end via the weld/braze 50 shown in FIGS. 5-6. The bimetal strip 52 embodiment of the switch 44-1 or 44-2 may also include a pad 53 arranged for contact with the battery module enclosure 38 and constructed from a thermal interface material, such as a thermally conductive pad made from silicone.

Figure 7:
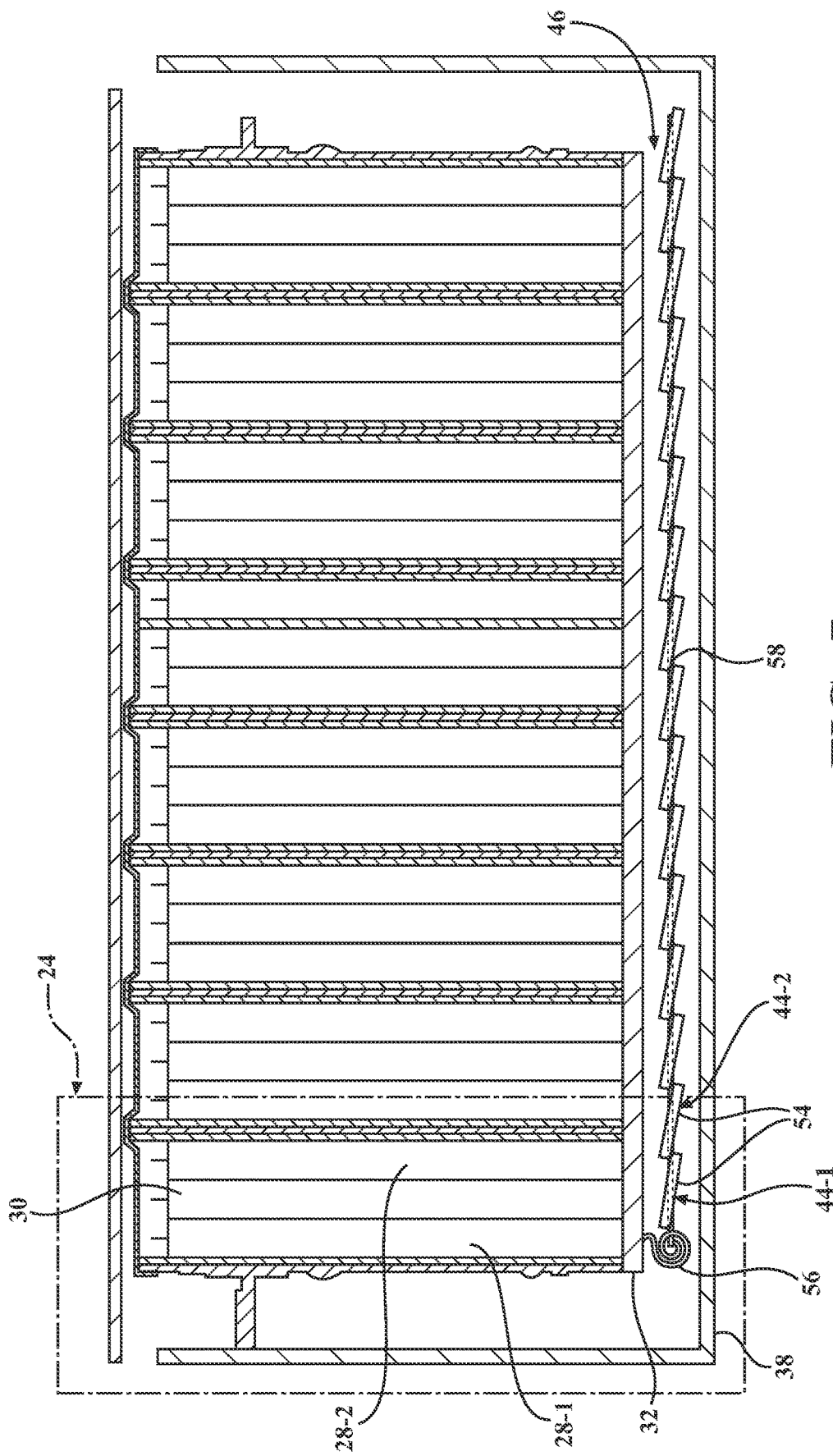
FIG. 7 is a schematic close-up cross-sectional partial plan view of the battery system shown in FIG. 2 and another embodiment of a heat transfer mechanism, wherein the heat transfer mechanism is depicted in an open state, according to the disclosure.
Figure 8:
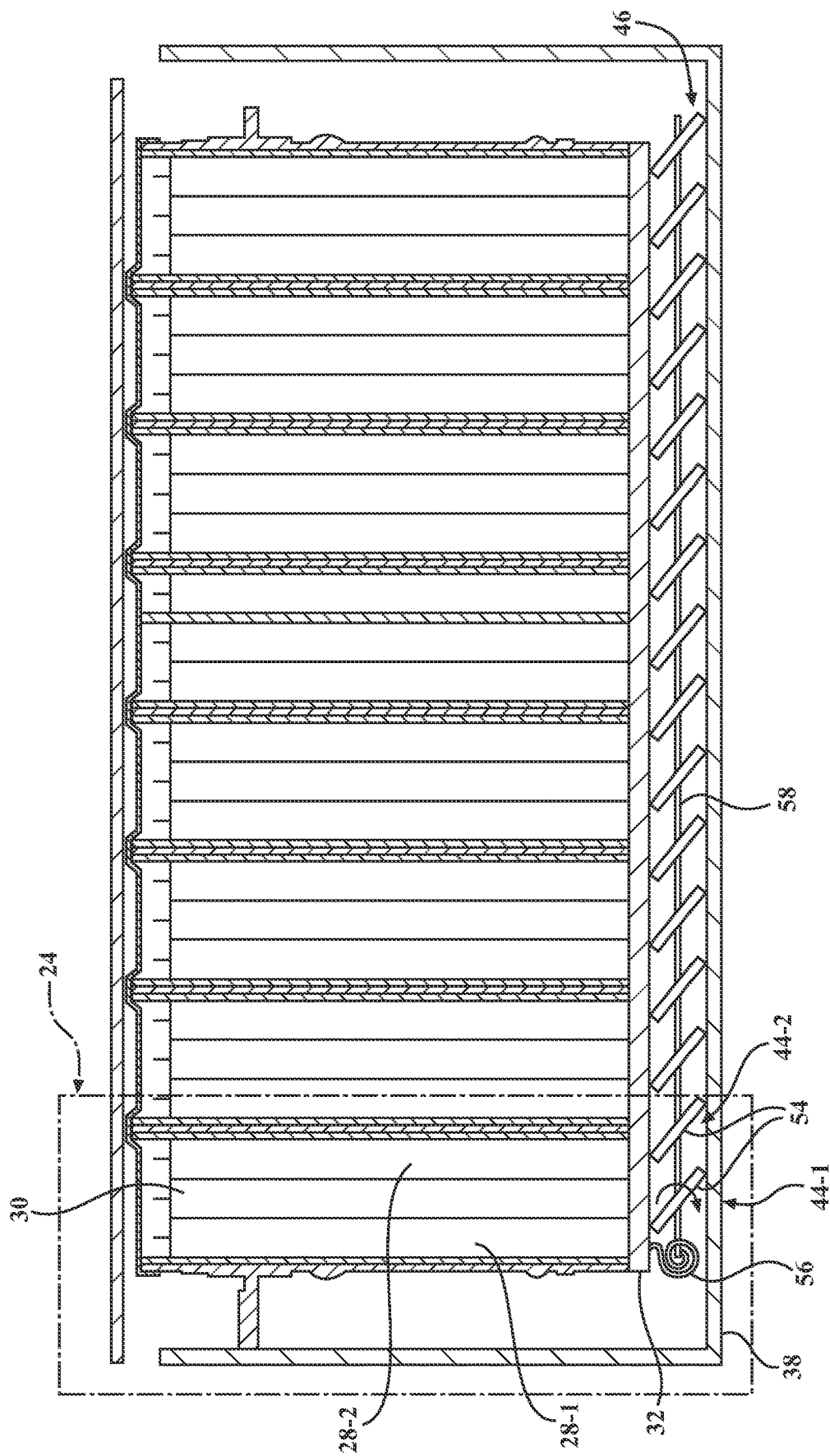
FIG. 8 is a schematic close-up cross-sectional partial plan view of the battery system shown in FIG. 7, with the switch of the heat transfer mechanism depicted in a closed state.
Figure 9:
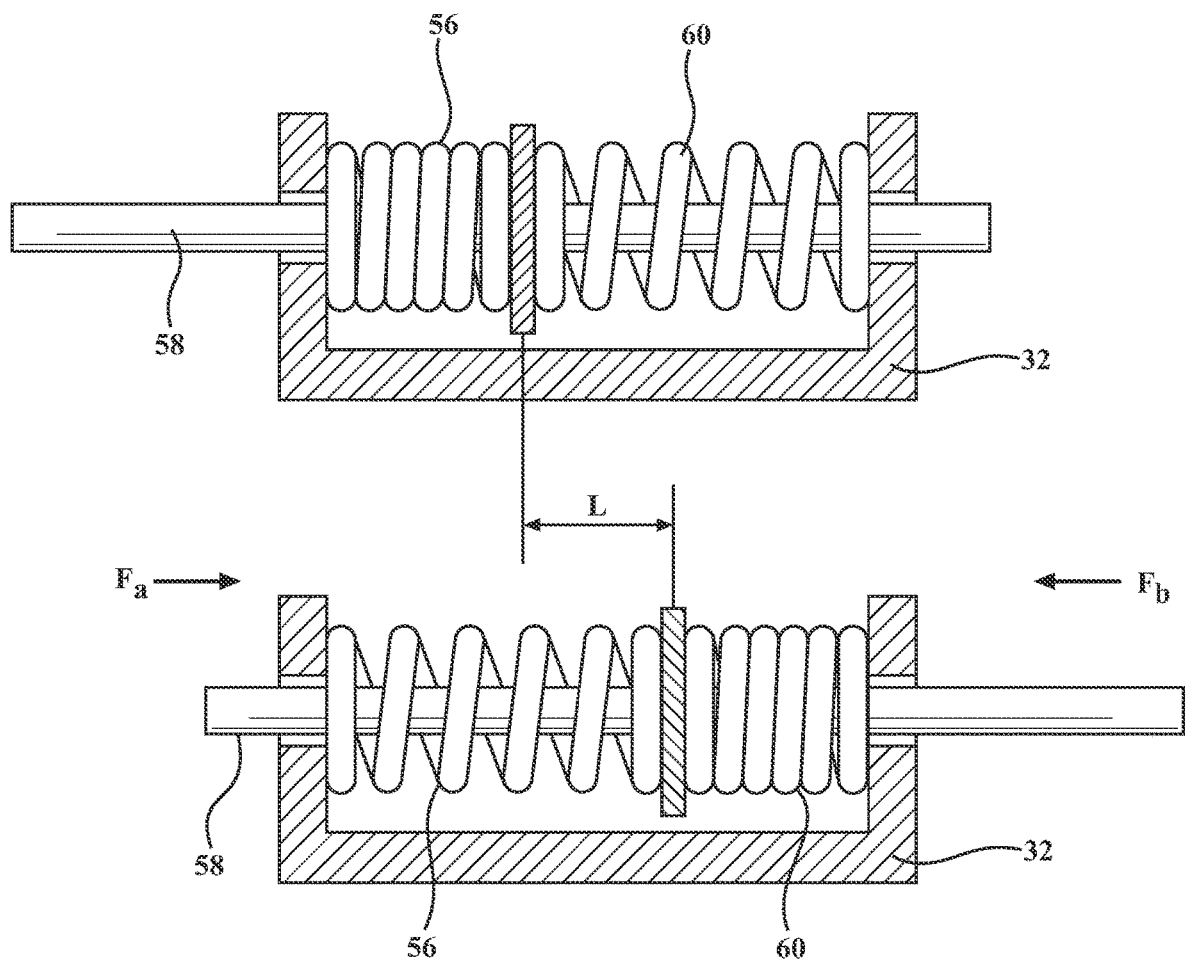
FIG. 9 is a schematic view of a shape-memory alloy actuator configured to rotate respective blade(s) of the heat transfer mechanism shown in FIGS. 7 and 8 to mitigate thermal runaway in the battery cell(s), according to the disclosure.

In another alternative, as shown in FIGS. 7 and 8, each of the first and second switches 44-1, 44-2 may include rotatable blade(s) 54 configured to shift into a conducting position (shown in FIG. 8) to bridge the air gap 46. Each of the first and second switches 44-1, 44-2 shown in FIGS. 7 and 8 also includes an SMA actuator 56 configured to rotate the respective blade(s) 54 about a respective axle (not shown) when the temperature of the corresponding first and second battery cells 28-1, 28-2 exceeds the predetermined value tc. Specifically, as shown in FIG. 9, the shape-memory alloy actuator 56 may be a coiled member mounted to the heat sink 32 and configured to change shape and exert a force Fa when the predetermined temperature value tc is exceeded. The force Fa imparted to shift the blade(s) 54 by a distance L into a conducting position via the SMA actuator 56 through the connecting rod 58 is illustrated in FIG. 9. In the embodiment of FIGS. 7 and 8, the blades 54 may be linked via a connecting rod 58 operated by the SMA actuator 56. As shown in FIG. 9, the action of the SMA actuator 56 may be countered by a bias spring 60 configured to assist the return of blade(s) 54 to their non-conducting position (shown in FIG. 7). Specifically, the bias spring 60 generates a force $F_b$ to retract the blade(s) 54 below the predetermined temperature value $t_c$.

Figure 10:
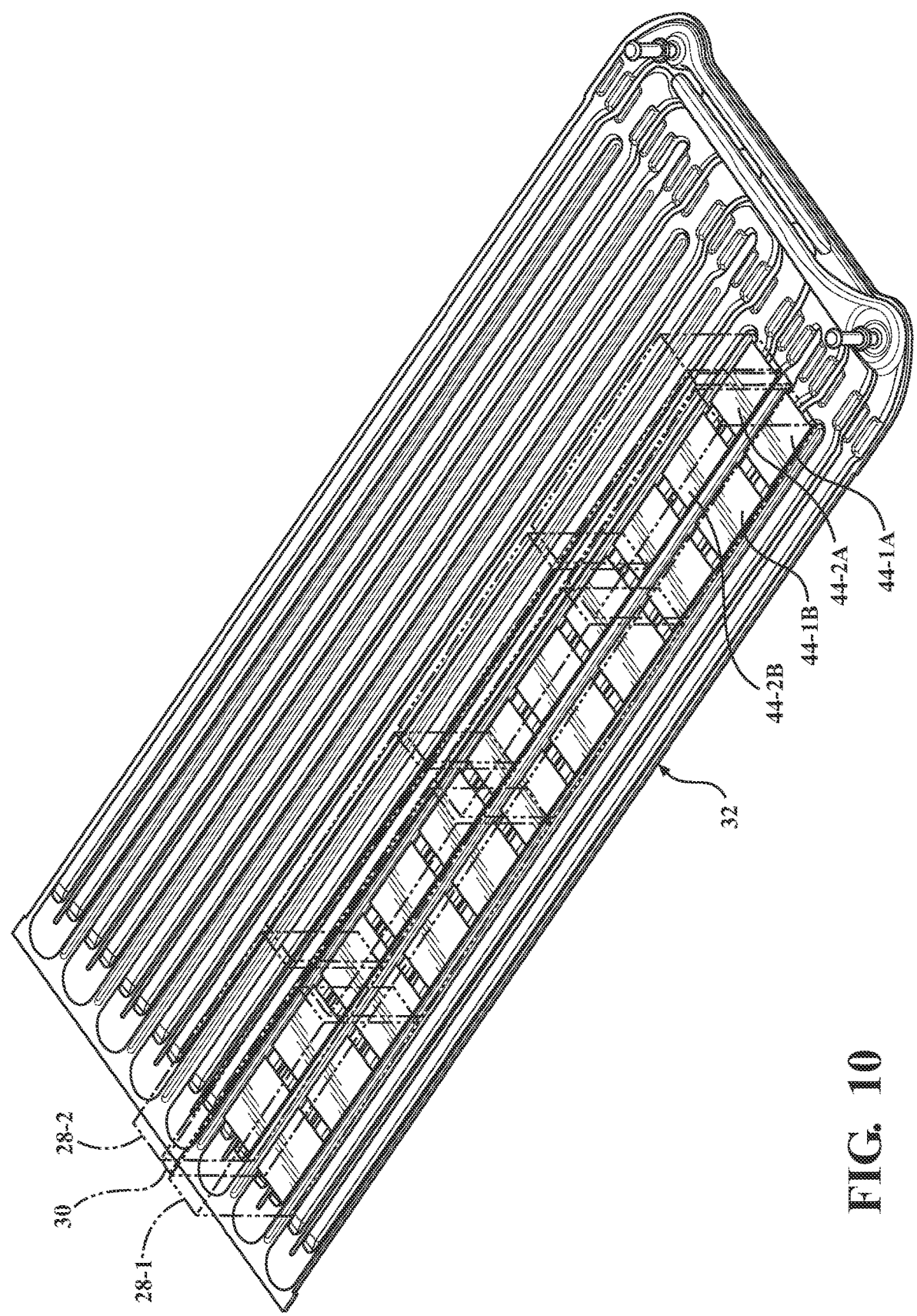
FIG. 10 is a schematic close-up cross-sectional perspective view of the heat sink, shown in FIG. 2, configured as a coolant plate and having a plurality of heat transfer mechanism switches mounted thereto, according to the disclosure.

In an additional embodiment shown in FIG. 10, the battery module 26 may include multiple switches associated with each battery cell 28-1 and 28-2 and mounted to the heat sink 32. Specifically, switches 44-1A and 44-1B are shown for the battery cell 28-1, and switches 44-2A and 44-2B are shown for the battery cell 28-2. Each of the switches 44-1A and 44-1B (as well as the switches 44-2A and 44-2B) may be configured to detect a distinct temperature range and transfer thermal energy from the corresponding first and second battery cell 28-1, 28-2 to the battery module enclosure 38 within the corresponding temperature range. Accordingly, in such an embodiment, the subject switches may operate in distinct temperature ranges, such that at an elevated, but lower temperature a single switch, 44-1A or 44-2A, may be activated, while at an even higher temperature, both switches 44-1A and 44-1B or 44-2A and 44-2B may operate together to transfer thermal energy to the battery module enclosure 38 quicker.

Overall, the heat transfer mechanism 42 is configured to detect and automatically respond to a battery cell in a battery module having reached a predetermined temperature by transferring excess thermal energy directly to the ambient. Thus, the heat transfer mechanism 42 is particularly effective in mitigating propagation of a thermal runaway within the battery module between individual battery cells, without requiring additional external hardware or controls.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery module comprising:
   a first battery cell and a neighboring second battery cell;
   a heat sink in contact with each of the first battery cell and the second battery cell and configured to absorb thermal energy from the first and second battery cells;
   a battery module enclosure surrounded by ambient environment and configured to house each of the first battery cell, the second battery cell, and the heat sink; and
   a heat transfer mechanism including a first switch configured to detect temperature of the first battery cell exceeding a predetermined value indicative of a thermal runaway event and transfer thermal energy from the first battery cell to the battery module enclosure to thereby control propagation of the thermal runaway event to the second battery cell;
   wherein:
      an air gap is arranged between the battery module enclosure and the heat sink and configured to insulate the battery module enclosure from the heat sink; and
      the first switch is configured to bridge the air gap and establish a direct contact between the battery module enclosure and the heat sink to conduct thermal energy from the first battery cell to the battery module enclosure.

2. The battery module of claim 1, wherein the first switch is configured as a shape-memory alloy element mounted to the heat sink and configured to change shape and thereby bridge the air gap when the temperature of the first battery cell exceeds the predetermined value.

3. The battery module of claim 1, wherein the first switch is a bimetal strip configured to change shape when the temperature of the first battery cell exceeds the predetermined value.

4. The battery module of claim 3, wherein the bimetal strip is one of welded and brazed to the heat sink.

5. The battery module of claim 1, wherein the first switch includes at least one rotatable blade configured to bridge the air gap and a shape-memory alloy actuator configured to rotate the at least one rotatable blade when the temperature of the first battery cell exceeds the predetermined value.

6. The battery module of claim 5, wherein the shape-memory alloy actuator is a coiled member configured to change shape when the temperature of the first battery cell exceeds the predetermined value.

7. The battery module of claim 5, wherein the at least one rotatable blade includes multiple rotatable blades linked via a connecting rod operated by the shape-memory alloy actuator.

8. The battery module of claim 1, wherein the heat sink is a coolant plate having a first coolant channel arranged proximate the first battery cell, and wherein the first switch is mounted adjacent the first coolant channel.

9. The battery module of claim 1, further comprising an insulating member arranged between the first battery cell and the second battery cell.

10. A motor vehicle comprising:
    a power-source configured to generate power-source torque; and
    a battery module configured to supply electrical energy to the power-source, the battery system including:
    a first battery cell and a neighboring second battery cell;
    a heat sink in contact with each of the first battery cell and the second battery cell and configured to absorb thermal energy from the first and second battery cells;
    a battery module enclosure surrounded by ambient environment and configured to house each of the first battery cell, the second battery cell, and the heat sink; and
    a heat transfer mechanism including a first switch configured to detect temperature of the first battery cell exceeding a predetermined value indicative of a thermal runaway event and transfer thermal energy from the first battery cell to the battery module enclosure to thereby control propagation of the thermal runaway event to the second battery cell;
    wherein:
       an air gap is arranged between the battery module enclosure and the heat sink and configured to insulate the battery module enclosure from the heat sink; and
       the first switch is configured to bridge the air gap and establish a direct contact between the battery module enclosure and the heat sink to conduct thermal energy from the first battery cell to the battery module enclosure.

11. The motor vehicle of claim 10, wherein the first switch is configured as a shape-memory alloy element mounted to the heat sink and configured to change shape and thereby bridge the air gap when the temperature of the first battery cell exceeds the predetermined value.

12. The motor vehicle of claim 10, wherein the first switch is a bimetal strip configured to change shape when the temperature of the first battery cell exceeds the predetermined value.

13. The motor vehicle of claim 12, wherein the bimetal strip is one of welded and brazed to the heat sink.

14. The motor vehicle of claim 10, wherein the first switch includes at least one rotatable blade configured to bridge the air gap and a shape-memory alloy actuator configured to rotate the at least one rotatable blade when the temperature of the first battery cell exceeds the predetermined value.

15. The motor vehicle of claim 14, wherein the shape-memory alloy actuator is a coiled member configured to change shape when the temperature of the first battery cell exceeds the predetermined value.

16. The motor vehicle of claim 14, wherein the at least one rotatable blade includes multiple rotatable blades linked via a connecting rod operated by the shape-memory alloy actuator.

17. The motor vehicle of claim 10, wherein the heat sink is a coolant plate having a first coolant channel arranged proximate the first battery cell, and wherein the first switch is mounted adjacent the first coolant channel.

18. The motor vehicle of claim 10, further comprising an insulating member arranged between the first battery cell and the second battery cell.

\* \* \* \* \*